Oct. 19, 1948.　　　　　G. E. THOMAS　　　　　2,451,589
LAWN MOWING MACHINE

Filed Nov. 26, 1945　　　　　　　　　　　　　　　2 Sheets-Sheet 1

Inventor
*George Edward Thomas*

By *Burns, Doane & Benedict*
Attorneys

Oct. 19, 1948.   G. E. THOMAS   2,451,589
LAWN MOWING MACHINE
Filed Nov. 26, 1945   2 Sheets-Sheet 2
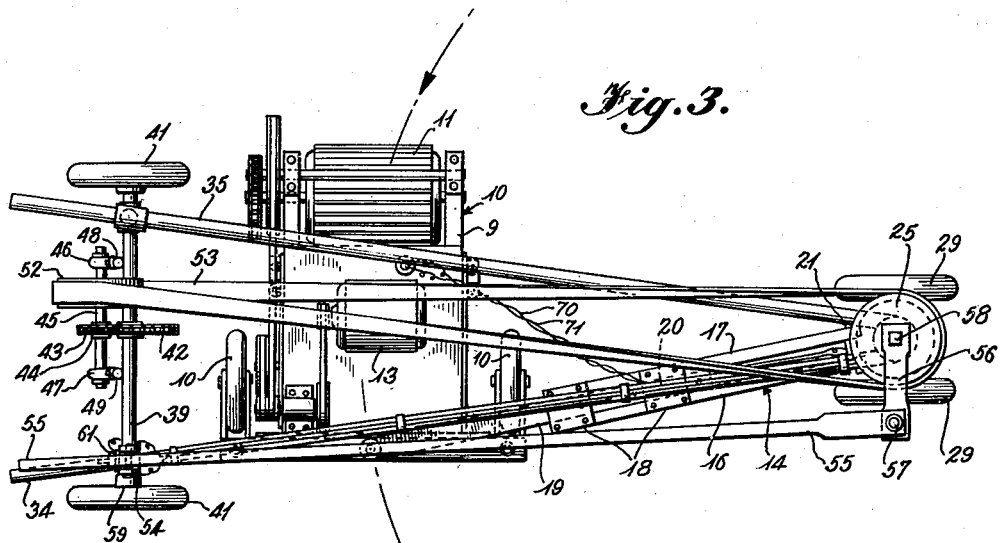
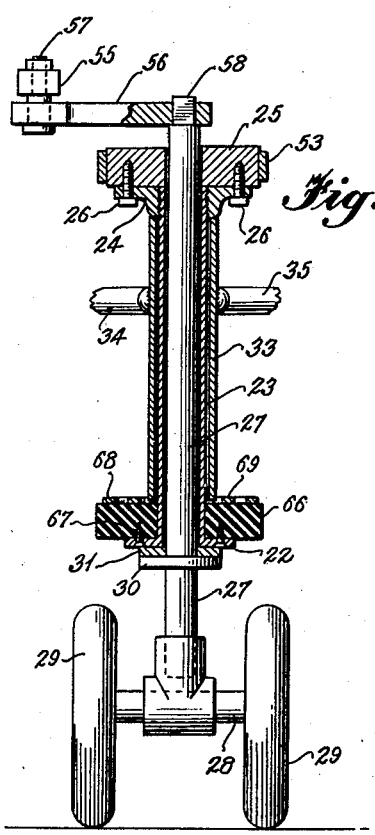
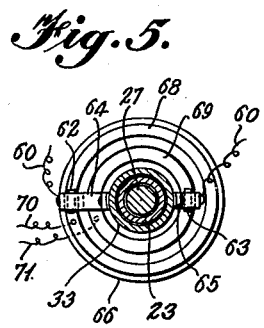
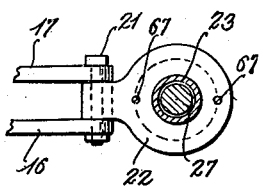
Inventor
*George Edward Thomas*
By *Burns, Doane & Benedict*
Attorneys Patented Oct. 19, 1948

2,451,589

UNITED STATES PATENT OFFICE 2,451,589

LAWN MOWING MACHINE

George Edward Thomas, Bogalusa, La.

Application November 26, 1945, Serial No. 630,708

5 Claims. (Cl. 56—26)

The present invention relates to a self-propelling mowing machine which does not require the constant attention of an operator and which, when properly adjusted and put into operation, can operate for prolonged intervals without supervision. A single operator will find it possible to supervise the operation of a plurality of mowing machines constructed in accordance with my invention and in this way there can be effected a great saving in manpower and in the cost of mowing lawns, golf courses, and the like.

My invention consists essentially of a wheeled chassis which includes a vertically disposed pivot post having a radius arm arranged for rotation around the pivot post and a self-powered and self-propelling mower attached to the outer end of the radius arm. The radius arm steers the self-propelling mower in a generally circular path around the pivot post and there is a driving connection between the radius arm and certain of the wheels of the chassis which causes the wheeled chassis to advance while the mower is describing its generally circular path around the pivot post. Means are provided for steering the chassis in a desired path and when the steering means is properly adjusted the machine may be left unattended until it becomes necessary to discontinue the operation of the machine along its pre-set path.

The primary object of my invention is to provide a self-powered and self-propelling mowing machine which does not require the constant attention and supervision of an operator. Another object of the invention is to provide a chassis for a mowing machine which can be used with any power mower having caster wheels which permit the mower to travel about the pivot post of the chassis without side drag while the chassis advances. Further objects and advantages of the invention will be referred to in the following detailed description which has reference to the accompanying drawings, wherein:

Fig. 3 is a top plan view thereof;

Fig. 4 is a sectional view taken in the direction of the arrows along the line 4—4 of Fig. 1;

Fig. 5 is a sectional view taken in the direction of the arrows along the line 5—5 of Fig. 1;

Fig. 6 is a sectional view taken in the direction of the arrows along the line 6—6 of Fig. 1.

Figure 1:
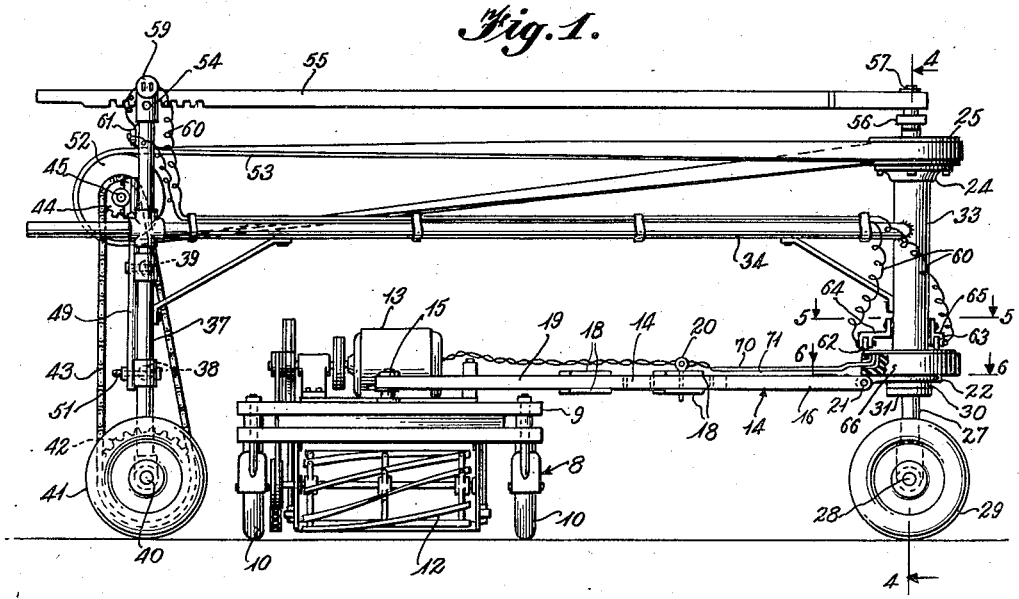
Figure 1 is a side elevation view of a mowing machine constructed in accordance with my invention.
Figures 2, 7:
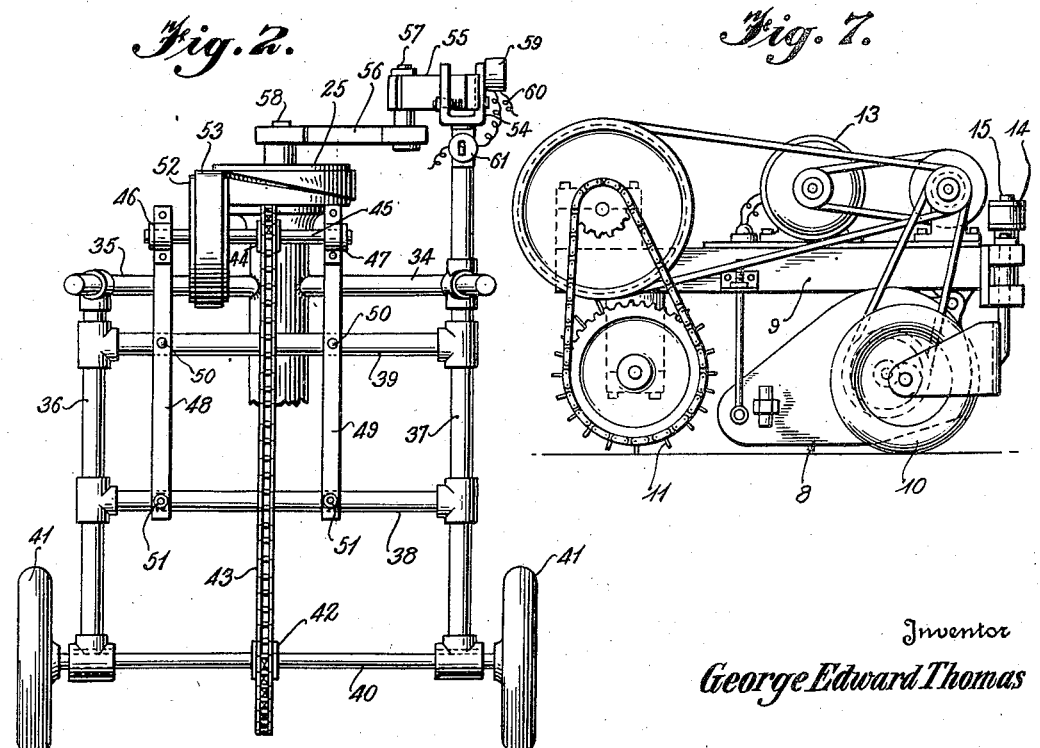
Fig. 2 is a fragmentary rear elevation view of the mowing machine with portions thereof eliminated from the drawing for clarity of illustration.
Fig. 7 is a side elevation view of a self-powered and self-propelling mower suitable for use with my invention.

A self-powered and self-propelling mower is designated generally by the reference numeral 8. I have shown a mower having a frame 9, caster-type wheels 10, a drive or traction roller 11, and a cutting reel 12. The mower is illustrated as provided with an electric motor 13 which drives the cutting reel 12 and the traction roller 11 through a series of belts and chains in a manner which will be apparent from an inspection of Figs. 1, 3 and 7. The caster wheels 10 should be sufficiently spaced from the frame of the mower to permit the mower to follow the chassis while the chassis is being moved from place to place.

The outer end of a radius arm 14 is pivotally mounted on a pin 15 near the forward end of the frame 9 of the mower 8. The radius arm 14 is adjustable in length by virtue of the fact that its inner portion consists of spaced parallel members 16 and 17 provided with upper and lower cross plates 18, while the outer end of the radius arm 14 consists of a single member 19 which fits between the members 16 and 17 and the upper and lower plates 18 and is held in position by means of a pin 20 extending through the plates 18 and through apertures in the member 19.

The members 16 and 17 of the radius arm 14 are pivotally connected by means of a pivot pin 21 to the lower flange 22 of a tubular member 23 which carries an upper flange 24 having a pulley 25 secured thereto by means of bolts 26. The tubular member 23 is positioned on a pivot post 27 having at its lower end an axle 28 on which are mounted a pair of steering wheels 29. A collar 30 is fixed on the pivot post 27 and a wear plate 31 is interposed between this collar and the lower surface of the lower flange 22. A tubular member 33 surrounds the tubular member 23 and forms a part of the chassis of the machine which is described in greater detail hereinafter.

It should be noted at this point that the pin 21 permits the outer end of the radius arm 14 to rise or descend as the mower 8 travels over uneven terrain, and that the radius arm 14 steers the mower 8 in a generally circular path. The radius arm 14 causes the tubular member 23 and the pulley 25 to rotate for the purpose of driving the chassis in a manner more particularly described later in this specification.

The frame of the chassis includes side bars 34 and 35 which diverge outwardly and rearwardly from the tubular member 33. The side bars 34 and 35 extend to and beyond upright side members 36 and 37, the extreme rearward ends of the side bars 34 and 35 forming handle members for manipulating the machine. A lower cross bar 38 and an upper cross bar 39 extend between the members 36 and 37. An axle 40 is rotatably mounted at the lower ends of the upright members 36 and 37 and drive wheels 41 are fixed to the outer ends of the axle. A sprocket 42 is fixed against rotation near the mid portion of the axle 40 and is driven by a chain 43 which engages a sprocket 44 fixedly secured on a countershaft 45. The countershaft 45 is mounted in bearings 46 and 47 which are secured respectively to the upper ends of adjustable members 48 and 49. The adjustable members 48 and 49 are loosely secured to the cross bar 39 by means of bolts or pins 50. The lower ends of the members 48 and 49 are adjustable relative to the cross bar 38 by means of bolts 51 which extend through the cross bar 38 and through the members 48 and 49 in a manner to permit the lower ends of the members 48 and 49 to be drawn nearer to the cross bar 38 for adjusting the tension in the drive belt hereinafter described.

The countershaft 45 also has fixed thereto a pulley 52 which is driven by a bolt 53 which also runs over the pulley 25. It will be apparent from the foregoing description that when the mower 8 is guided through its circular path by the radius arm 14, the tubular member 23 and the pulley 25 will be caused to rotate. Rotation of the pulley 25 causes rotation of the pulley 52 through the belt 53. Rotation of the pulley 52 causes rotation of the sprocket 44 which rotates the sprocket 42 through the chain 43 and drives the axle 40 and the drive wheels 41 to cause the chassis to advance. The relative diameters of the pulleys 25 and 52 and the sprockets 42 and 44 are preferably such as to cause the chassis to advance during each complete revolution of the radius arm 14 about the pivot post 27 through a distance which approximates the width of the swath cut by the mower 8. When the chassis is advancing in a straight line it will be found that the mower 8 will cover the area twice, and I have found this to be advisable for the reason that it contributes to cleaner mowing and more favorable results.

The upright member 37 extends above the side bar 34 and carries at its upper end a yoke 54, in which rests the notched lower edge of a steering rod 55. The forward end of the steering rod 55 is pivotally secured to a steering arm 56 by means of a pin 57. The opposite end of the steering arm 56 is secured against rotation on the upper end 58 of the pivot post 27. Adjustment of the steering rod 55 thus positions the wheels 29 to cause the chassis to follow any desired path. The proper adjustment of the steering rod 55 is maintained by the notches in the lower edge of the steering rod which engage the yoke 54.

Electric power may be supplied to the mowing machine by means of a cord which is connected to the female plug 59 which is secured to one leg of the yoke 54. The power is transmitted through conductors 60 and through a switch 61 to brushes 62 and 63 which are mounted on brackets 64 and 65, respectively, attached to and insulated from the tubular member 33. The lower flange 22 on the tubular member 23 carries on its upper surface an insulating disk 66 which is secured to the flange 22 by means of screws 67. The insulating disk 66 carries on its upper surface a conducting ring 68 which is engaged by the brush 62 and a second conducting ring 69 which is engaged by the brush 63. Conductors 70 and 71 are connected respectively to the conducting rings 68 and 69 and these conductors conduct the power to the electric motor 13. In the event that it is desired to substitute an internal combustion engine for the electric motor 13, the circuit just described may be used to control the ignition.

The mowing machine may be easily manipulated for making sharp turns while it is in operation merely by lifting on the handles formed by the rear ends of the side bars 34 and 35 to raise the drive wheels 41 off the ground, whereupon the chassis may be turned about the front wheels 29. The machine may also be moved over longer distances merely by pushing the chassis at a rate of speed which enables it to keep pace with the mower 8 and which prevents that mower from revolving about the pivot post 27. On large lawns or on golf courses, the machine may be set to advance in a straight line from one end of the area to be mowed to the other end thereof. It is possible when using a plurality of machines for one operator to be located at each end of the area to be mowed so that the operators can successively turn the machines when they reach the end of the area. The steering bar 55 may be adjusted to cause the machine to follow an arcuate path and this will be found desirable in many instances.

I have illustrated and specifically described what I now consider to be the preferred form of my invention. However, it is to be understood that many variations and modifications may be resorted to without departing from the broader aspects of the invention as defined by the following claims.

Having thus described my invention, I claim:

1. In a machine of the character described, the combination of a vehicle having rear and front wheels, a rod extending upwardly from the axle of the front wheels, a steering lever connected to the upper end of said rod and extending to the rear of the vehicle, a tube surrounding said rod, a pulley secured to the upper end of said tube, a driving disk secured to the lower end of said tube, operating connections for rotating said tube and disk, a countershaft mounted on the rear of the vehicle, a second pulley secured to said countershaft, a belt connecting said pulleys, operating connections between said countershaft and the axle of the rear wheels, a radius arm hingedly connected to said driving disk, a mower frame, and a universal coupling connecting the outer end of said radius arm with said frame.

2. In a machine of the character described, the combination of a vehicle having rear and front wheels, a rod extending upwardly from the axle of the front wheels, a steering arm secured to the upper end of said rod, a steering lever connected with said steering arm and extending to the rear of the vehicle, a tube surrounding said rod, a pulley secured to the upper end of said tube, a driving disk secured to the lower end of said tube, two rings secured to the upper side of said disk, a larger tube surrounding said first mentioned tube, rollers secured to the lower end of said larger tube and contacting said rings respectively, connections for rotating said first mentioned tube and disk, a countershaft mounted on the rear of the vehicle, a second pulley secured to said countershaft, a belt connecting said pulleys, a sprocket chain connection between said countershaft and the axle of the rear wheels, handle members secured to said larger tube and extending to the rear of the vehicle, a radius arm hingedly connected to said driving disk, a mower frame, a universal coupling connecting the outer end of said radius arm with the center of said frame, and caster wheels on which said frame is supported.

3. A mowing machine comprising a chassis having wheels, a pivot post mounted on said chassis, a radius arm having one of its ends connected to said pivot post, a self-propelling mower attached to the other end of said radius arm and arranged to be steered by said radius arm in a generally circular path about said pivot post, and a driving connection between said radius arm and certain of the wheels of said chassis causing said chassis to advance during travel of said self-propelling mower around said pivot post.

4. A mowing machine comprising a self-propelling mower, a radius arm having one of its ends connected to said mower and having its opposite end connected to a pivot post to steer said self-propelling mower in a generally circular path about said pivot post, said pivot post being mounted on a chassis, wheels on said chassis, and a driving connection between said radius arm and certain of said wheels causing said chassis to advance during travel of said self-propelling mower around said pivot post.

5. A mowing machine comprising a chassis including a frame, rear drive wheels and front steering wheels, said front steering wheels being mounted on an axle secured to a vertically disposed pivot post, a radius arm extending laterally from said pivot post and arranged to turn on said pivot post, a self-propelling mower attached to the outer end of said radius arm and arranged to be steered thereby in a generally circular path about said pivot post, and a driving connection between said radius arm and said rear drive wheels causing said chassis to advance upon movement of said self-propelling mower and said radius arm about said pivot post.

GEORGE EDWARD THOMAS.

REFERENCES CITED

The following references are of record in the file of this patent:

UNITED STATES PATENTS

| Number | Name | Date |
|---|---|---|
| 901,605 | Ferris | Oct. 20, 1908 |
| 1,449,649 | Brown | Mar. 27, 1923 |
| 2,194,617 | Scott | Mar. 26, 1940 |
| 2,421,558 | Goldsmith | June 3, 1947 |

FOREIGN PATENTS

| Number | Country | Date |
|---|---|---|
| 467,871 | France | Apr. 8, 1914 |